Dec. 15, 1964     D. I. REBIKOFF     3,161,168
SUBMARINE SELF-PROPELLING DEVICE
Filed Sept. 28, 1961
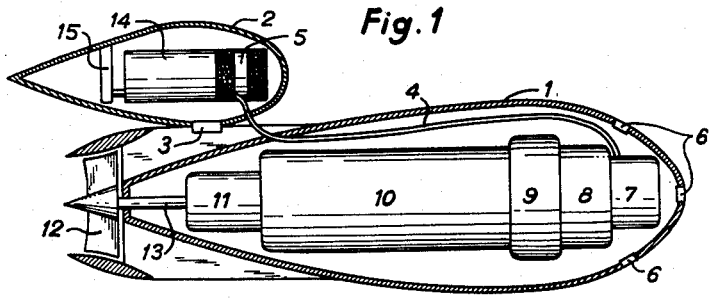
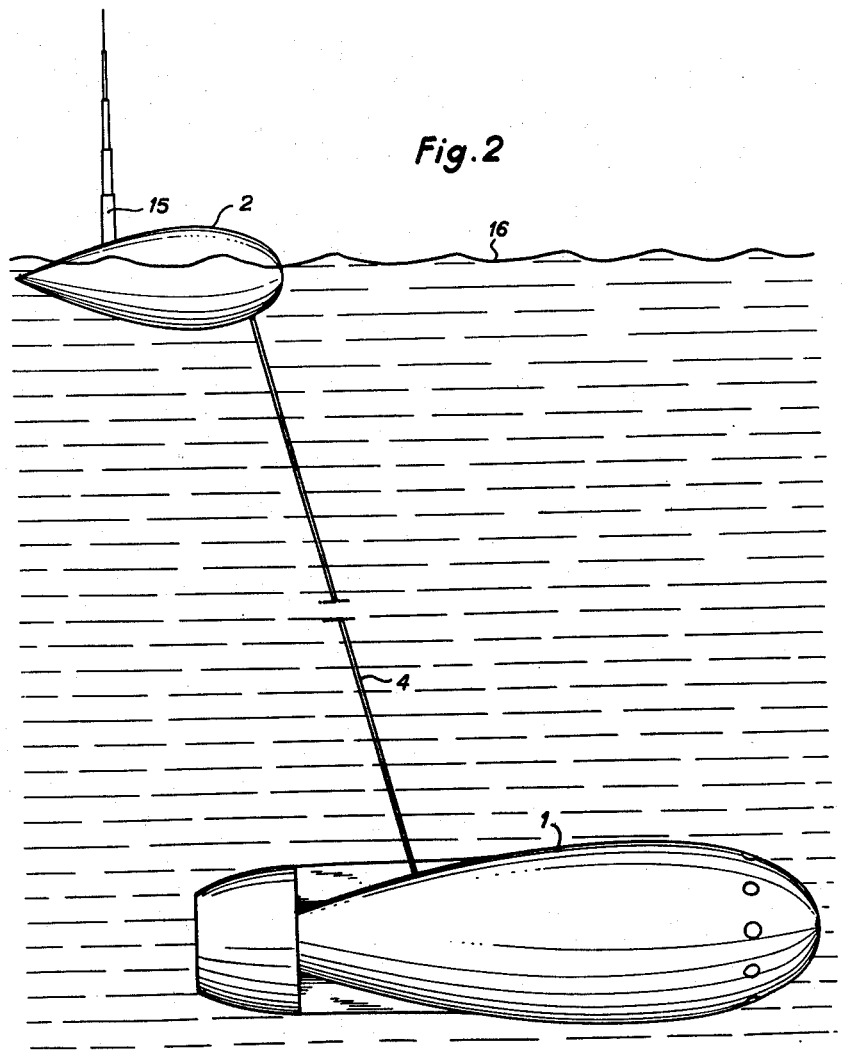

United States Patent Office 3,161,168
Patented Dec. 15, 1964

3,161,168
SUBMARINE SELF-PROPELLING DEVICE
Dimitri Issaiewitch Rebikoff, New York, N.Y., assignor to Loral Electronics Corporation, a corporation of New York
Filed Sept. 28, 1961, Ser. No. 141,425
3 Claims. (Cl. 114—21)

The present invention relates to a submarine self-propelling device, equipped for the detection of underwater sound and, upon the detection of such sound, adapted to be placed in action by the remote control from a control station which has been duly advised automatically of the said sound by means provided by the device in accordance with the invention, it being possibe to use the said operation for extremely different purposes, such as motion picture photography or televising of a subject moving in the liquid in which the device is traveling, or else for the attacking of self-propelled submarine vessels or boats, or for the giving off of acoustic vibrations of the liquid in question.

The device in the preferred form of the present invention presents the combination of two submarine hulls, each having a suitable nautical shape, one of said hulls, designated as the "principal hull," containing a combination of means which take part in the operating cycle and which leads to the above mentioned remote-controlled operation, all the means suitable for underwater self-propulsion and to the feeding with electrical energy of all the members which utilize such energy in the device. The other hull, known as the "self-emersion hull" or float hull, also contains members or means taking part in the operating cycle, is arranged as a float constantly connected to the principal hull by means of a single cable containing a suitable number of electrical conductors and capable of constituting a towline, said cable being coiled about a reel and arranged to be paid out therefrom, which reel is housed in one of said hulls, preferably in the said shelf-emersion hull. The float hull is temporarily rigidly connectable with the principal hull externally in a manner suitable for the appropriate nautical maneuvering of the assembly of the two interconnected hulls, the said rigid connection being intended to assure upon the starting under way of the device that the self-emersion hull will be forced underwater with the other hull and not released therefrom until the detection of a predetermined underwater sound.

The device may be best employed in a special operating cycle, consisting of the three following phases:

(1) *Auto-Exploration Phase in Accordance With a Program Which Is Pre-Established by the Control Station*

This phase comprises the starting up of the self-propagating means of the device under the control of an automatic pilot which is controlled by a programmer of any suitable type, such as a magnetic-tape programmer, the program of which, previously determined by the control system station, defines the route of the device, bearings, depth of immersion, as well as its speed of travel, the programmer being connected to the automatic pilot via a switch system, the role of which will be explained further below. During this first phase of the operating cycle, the self-emersion hull is rigidly connected with the principal hull by an attachment means so arranged that it may be released and is capable of causing the automatic instantaneous interruption of the said rigid connection as a result of the detection of a predetermined sound, such as one having a particular frequency or spectrum or sequence of frequencies, for instance by placing in resonance, a result of the detection, electric circuits which have been previously turned by the control station to one or more of these particular frequencies. This may be done by using resonant reeds or one or more "flip-flop" circuits whose cathodes are tuned to such predetermined frequencies or other recognized means of detecting a desired frequency or series thereof whether such series be concomitant or sequential.

(2) *Radio-Information Phase of the Control Station*

This second phase is automatically commenced by the detection of the desired predetermined underwater sound by means of a type of "passive sonar," and comprises first of all the instantaneous automatic release of the self-emersion hull, accompanied by the automatic extension of a telescopic antenna which is originally folded back and concealed in the said hull, and then the automatic transmission over a distance by a transmitter, preferably a radio-transmitter system housed in the self-emersion hull and connected to the said antenna. Radio carriers may be modulated in accordance with the detected sound carrier modulating means of conventional type being employed to insert in the information signal emitted intelligence with respect to such matters as the nature and location of the detected sound, its direction of travel, its speed and the like, while the principal hull continues its programmed underwater progress, towing the self-emersion hull, which then floats with its antenna extended on the surface of the liquid in which it is traveling, pulled by the electric cable connecting the two hulls.

(3) *Phase of Radio Remote-Control of the Principal Hull by the Control Station*

This third phase is the final phase of the operating cycle.

The signals emitted by the antenna of the self-emersion hull are picked up by the control station which, of course, is outside of the hulls and is provided for this purpose with a suitable receiver. After identification of the detected underwater sound, the signals may be acted on by the control station which is provided for this purpose with a suitable transmitter by means of which said control station may transmit command signals which the antenna of the self-emersion hull, connected electrically as transmitting-receiving antenna, transmits to suitable means contained in the principal hull and, in particular, to the aforementioned switch system arranged between the programmer and the automatic pilot. Upon the reception of the command signal, these means cause the switching of control of the automatic pilot to the output of a receiving system connected to the antenna simply by disconnecting the programmer from the automatic pilot. Then direct control of the automatic pilot by the control station is effected by connecting the output of the receiver to said automatic pilot and feeding such output, i.e., the detected intelligence contained in the command signal, to the automatic pilot. Additionally, to effect a useful task, the direct control by the said control station of any other means, such as the placing in operation of a motion picture or televising unit, or else the attacking of a boat or submarine, neutralizing the firing safety of an explosive charge housed for this purpose in the principal hull, i.e., arm an explosive charge, may simultaneously be effected by feeding a portion of the intelligence in the command signal to such means to effect a useful task.

The carrying out of this three-phase operating cycle involves the use of numerous means, most of which individually may be considered as falling within the prior art. The invention resides principally in the combination of these means.

The attached schematic drawing shows one example by way of illustration and not of limitation of a device in accordance with the invention.

In this schematic drawing:

FIG. 1 shows, in axial vertical section, an embodiment of a device in accordance with the invention, the two hulls of which are rigidly connected together as contemplated for the first phase, the so-called programmed exploration phase, the interior housings in the hull not being shown in section, and FIG. 2 shows the respective location of the two component hulls of the device during the other two phases of the operating cycle.

In FIG. 1, the numbers 1 and 2 designate the main or principal submarine hull and the self-emersion submarine hull respectively. The attachment means 3 detachably rigidly secures the two hulls to one another. Attachment means 3 may be simply an electric magnet which is cut off from the battery when the desired predetermined sound is detected by transducers 6. Other attachment means may comprise conventional explosive bolts such as the type used to hold together sections of rockets and which will be actuated upon the separation of such sections. A third type may be a mechanical lock which secures the two hulls together and which may be released by a spring which is unlatched by a small magnet. Still another method may employ a small amount of compressed gas within a capsule which actuates a piston upon receipt of a signal. The electric cable 4 connects the two hulls, extending into their interiors, said cable being coiled about reel 5 mounted within hull 2 and arranged to be paid out therefrom.

In the principal hull 1, there are arranged the pick-ups or transducers 6 of a suitable type, such as of the "hydrophone" type. The rectangle 7 represents the assembly of the electric and electronic apparatus taking part in the various phases of the operating cycle; the rectangle 8 indicates the automatic pilot; the rectangle 9 indicates, solely by way of a specific example, an explosive charge; the rectangle 10 indicates a set of storage batteries; the rectangle 11 indicates a silent electric motor borne by suitable means which prevent any transmission of vibration to the main hull 1, and said motor drives the propeller 12 via the shaft 13.

In order not to clutter the drawings, there have not been shown any of the nautical control members, nor any of the electrical connections nor any of the conventional apparatus of submarine navigation. Such control members, connections and apparatus are illustrated in my U.S. patents numbered 2,918,889 and 2,948,247, my copending application Serial No. 15,208, now abandoned, entitled Method of Underwater Search and Device for the Practical Application of the Method, my pending application Serial No. 49,391, now abandoned, entitled Underwater Vehicle, as well as in U.S. Patent No. 2,433,971 granted to H. A. Adams.

In the self-emersion hull 2, the assembly of the electric and electronic apparatus housed in said hull is represented in 14, and 15 in an antenna of the telescopic type in folded position, concealed in the said hull.

This antenna is adapted to extend automatically, for instance by being biased to an extended position by means of springs bearing against the bottom thereof. In another form, the antenna may be erected by unrolling a flexible steel band. The antenna may also be erected by means of a telescopic system which includes the antenna, the topmost section having a closed end and gas introduced under pressure into the open end. For the gas pressure there may be substituted hydraulic pressure. The antenna is held in folded or collapsed position prior to the starting up of the device, and held in this position during the first phase of the operating cycle by means of an interlock or locking means consisting of the combination of a block of salt and a calibrated manometric capsule or chamber. The block of salt assures the locking at the start and is positioned so as to initially prevent the antenna from being extended. The manometric capsule or chamber assures that the interlocking will continue for a depth of immersion greater than its calibration. Preferably this calibration is set substantially at sea-level atmospheric pressure so that the antenna is not extended until the self-emersion hull 2 rises to the surface. The block of salt is dissolved gradually from the start of the first phase by action of the water to which it is exposed. Upon the emersion of hull 2, the manometric capsule or chamber, which assured the interlocking drug immersion even after the block of salt has dissolved, permits the automatic extension of the antenna at the time of the emersion by expanding sufficiently to unlock the antenna. Alternately, a Bourdon tube may be employed to establish an electric contact or mechanical release upon the arrival at a predetermined pressure level. Where pressure means are not employed, the latch means can consist of two space terminals across which an electric current passes when the terminals are immersed in sea water, but which circuit across such terminals is interrupted when the terminals emerse from such water, the interruption of the circuit releasing latch means associated with the telescoping antenna.

In FIG. 2, hulls 1 and 2 are not rigidly connected, but are still connected by cable 4. Principal hull 1 remains immersed while hull 2 floats, its antenna extended, on the surface 16 of the liquid in which it is traveling and is towed by principal hull 1.

It is not desired to be limited except as set forth in the following claims, the above description being by way of illustration of the invention.

What is claimed is:

1. In combination with a principal hull adapted for self-propelled underwater travel including a hydro-acoustic transducer and detection means connected to said transducer to produce an actuating signal upon presentation of a predetermined underwater sound to said transducer comprising in combination:
   (a) a buoyant self-emersion submarine hull,
   (b) attachment means rigidly detachably securing said principal and self-emersion hulls,
   (c) means connected to the detection means to release said attachment in response to said actuating signal,
   (d) a radio transmitter connected to said self-emersion hull and adapted to emit an information signal upon emersion of said self-emersion hull,
   (e) a deformable insulated electrical conductor extending between the interiors of said hulls,
   (f) a radio receiver mounted to said self-emersion hull and connected to said electrical conductor, said reception means being adapted to receive a command signal from without said hulls, and
   (g) said radio transmitter and radio receiver including a common antenna normally locked in a collapsed condition, means connected to said antenna to erect the same after said antenna is unlocked, locking means for said antenna attached thereto, including first locking means released by contact with water for a predetermined time and second locking means released upon exposure to a pressure less than a predetermined minimum pressure approximating atmospheric pressure whereby said antenna will be extended only after both a predetermined interval of submersion of said self-emersion hull and substantially upon emersion thereof from the water, (h) means connected to said electrical conductor within said principal hull to control said principal hull.

2. The combination as described in claim 1, said first locking means comprising a block of salt positioned relative said antenna to block the extension thereof.

3. The combination as described in claim 1, said second locking means comprising a manometric chamber positioned relative said antenna to block the extension thereof until said chamber has attained at least a predetermined minimum size.

References Cited in the file of this patent

UNITED STATES PATENTS

| | | |
|---|---|---|
| 227,637 | McMullen | May 18, 1880 |
| 1,473,149 | Hammond | Nov. 6, 1923 |
| 2,422,337 | Chilowsky | June 17, 1947 |
| 2,963,543 | Link et al. | Dec. 6, 1960 |

OTHER REFERENCES

| | | |
|---|---|---|
| 21,019 | Great Britain | Sept. 26, 1902 |